United States Patent
Li et al.

(10) Patent No.: US 10,203,595 B2
(45) Date of Patent: Feb. 12, 2019

(54) AUTOFOCUS TESTING DEVICE

(71) Applicant: Beijing Xiaomi Mobile Software Co., Ltd., Beijing (CN)

(72) Inventors: Hongming Li, Beijing (CN); Zhibin Zhou, Beijing (CN); Yi Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/791,989

(22) Filed: Oct. 24, 2017

(65) Prior Publication Data
US 2018/0113381 A1    Apr. 26, 2018

(30) Foreign Application Priority Data
Oct. 25, 2016    (CN) .......................... 2016 1 0938185

(51) Int. Cl.
*G03B 43/00* (2006.01)
*G03B 13/36* (2006.01)
*H04N 17/00* (2006.01)
*H04N 5/232* (2006.01)

(52) U.S. Cl.
CPC ............. *G03B 43/00* (2013.01); *G03B 13/36* (2013.01); *H04N 17/002* (2013.01); *H04N 5/23212* (2013.01)

(58) Field of Classification Search
None
See application file for complete search history.

(56) References Cited

U.S. PATENT DOCUMENTS

| 4,423,934 | A  * | 1/1984  | Lambeth | G03B 43/00 396/213 |
| 4,924,253 | A  * | 5/1990  | Imai    | G02B 7/32 396/419 |
| 9,473,690 | B1 * | 10/2016 | Baudat  | H04N 5/23212 |
| 2004/0109080 | A1 * | 6/2004 | Chan | H04N 5/23212 348/345 |

(Continued)

FOREIGN PATENT DOCUMENTS

KR    20-0187390 Y1    7/2000

OTHER PUBLICATIONS

Extended European Search Report dated Mar. 15, 2018 in European Patent Application No. 17197718.4, 7 pages.

*Primary Examiner* — William B Perkey
(74) *Attorney, Agent, or Firm* — Oblon, McClelland, Maier & Neustadt, L.L.P.

(57) ABSTRACT

The present disclosure relates to an autofocus testing device. The autofocus testing device includes a first focusing plate; a second focusing plate; a driver configured to drive at least one of a camera and the first and second focusing plates to aim a lens of the camera at the first and second plates in turn, wherein a first distance between the first focusing plate and the camera is different from a second distance between the second focusing plate and the camera; and a controller configured to obtain status information of the driver, determine whether the lens is aimed at one of the first and second focusing plates based on the status information, and control the camera to perform an autofocus image capture operation when the lens is aimed at one of the first and second focusing plates.

15 Claims, 6 Drawing Sheets

(56) References Cited

U.S. PATENT DOCUMENTS

| | | | |
|---|---|---|---|
| 2009/0180021 A1* | 7/2009 | Kikuchi | H04N 5/2253 348/349 |
| 2012/0050543 A1* | 3/2012 | Colla | G03B 43/00 348/187 |
| 2012/0229652 A1 | 9/2012 | Lee et al. | |
| 2014/0240518 A1 | 8/2014 | Lewinnek et al. | |
| 2016/0014404 A1* | 1/2016 | Krestyannikov | G06T 7/80 348/187 |
| 2016/0330437 A1* | 11/2016 | Kang | H04N 17/002 |
| 2017/0280135 A1* | 9/2017 | Shroff | H04N 17/002 |
| 2018/0113381 A1* | 4/2018 | Li | G03B 43/00 |

* cited by examiner

AUTOFOCUS TESTING DEVICE

CROSS-REFERENCE TO RELATED APPLICATIONS

This application is based on and claims a priority to Chinese Patent Application No. 201610938185.X, filed on Oct. 25, 2016, the entire contents of which are incorporated herein by reference.

TECHNICAL FIELD

The present disclosure relates to the optical technology field, and more particularly, to an autofocus testing device.

BACKGROUND

Autofocus is an important function of a camera. Therefore, in order to ensure that the autofocus function of the camera is operating normally when the camera leaves a factory, it is usually required to perform an autofocus test.

Existing autofocus tests are performed by holding the camera manually or placing the camera on a slide rail to make it move back and forth, such that the camera can perform the autofocus under different focal lengths, thus realizing the autofocus test.

Such manual autofocus tests require a lot of manpower, and cost is high and efficiency is low.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide an autofocus testing device. The autofocus testing device includes a first focusing plate; a second focusing plate; a driver configured to drive at least one of a camera and the first and second focusing plates to aim a lens of the camera at the first and second plates in turn, wherein a first distance between the first focusing plate and the camera is different from a second distance between the second focusing plate and the camera; and a controller configured to obtain status information of the driver, determine whether the lens is aimed at one of the first and second focusing plates based on the status information, and control the camera to perform an autofocus image capture operation when the lens is aimed at one of the first and second focusing plates.

In an aspect, the first focusing plate and the second focusing plate are disposed on an optical axis of the lens in front of the lens of the camera. The driver includes a first steering engine configured to control the first focusing plate to be in an erect state or a fallen state. When the first focusing plate is in the erect state, then the first focusing plate intersects the optical axis and directly faces the lens of the camera. When the first focusing plate is in the fallen state, then the first focusing plate does not intersect the optical axis, and the second focusing plate intersects the optical axis and directly faces the lens of the camera.

In another aspect, the camera is disposed between the first focusing plate and the second focusing plate; and the driver includes a first steering engine that is configured to rotate the camera such that the lens of the camera is directed towards the first focusing plate or the second focusing plate.

In an aspect, a surface of the first focusing plate faces towards the camera, and a surface of the second focusing plate faces towards the camera.

In another aspect, a plate surface of the first focusing plate faces towards the camera, and a plate surface of the second focusing plate does not face towards the camera.

In an aspect, the driver further includes at least one second steering engine configured to control at least one of the first focusing plate and the second focusing plate to rotate around an axis in a vertical direction.

In an aspect, when the lens of the camera directly faces the first focusing plate, the controller is configured to control the second steering engine to drive the first focusing plate to rotate the first focusing plate to face the lens of the camera in a preset angle; and when the lens of the camera to be tested directly faces the second focusing plate, the controller is configured to control the second steering engine to drive the second focusing plate to rotate the second focusing plate to face the lens of the camera in a preset angle.

In an aspect, the distance between the camera and the first focusing plate is from 10 cm to 30 cm, and the distance between the camera and the second focusing plate is from 100 cm to 300 cm.

The controller is also configured to analyze an image taken by the autofocus image capture operation; and determine whether an autofocus function of the autofocus image capture operation is operating successfully.

The device also includes a camera base, wherein the camera is arranged on the camera base.

In an aspect, each of the first focusing plate and the second focusing plate is provided with a figure for focusing.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

Figure 1:
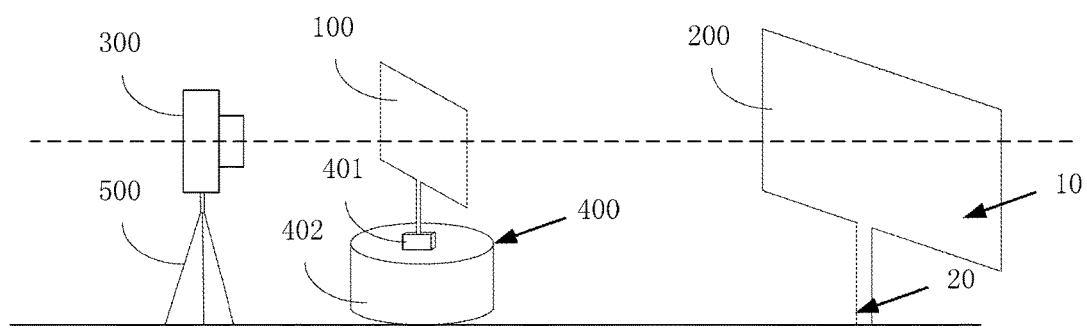
FIG. 1 is a schematic diagram of an autofocus testing device according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Aspects of the present disclosure provide an autofocus testing device. The device includes two spaced focusing plates, a drive unit and a control unit. The drive unit is configured to drive at least one of a camera to be tested and the two focusing plates to rotate under a control of the control unit, so as to enable the camera to be tested to aim at the two focusing plates in turn, in which a distance between one of the two focusing plates and the camera to be tested is different from a distance between the other one of the two focusing plates and the camera to be tested. The control unit is configured to control the drive unit, to obtain status information of the drive unit, to determine whether a lens of the camera to be tested directly faces one of the two focusing plates according to the status information; and to control the camera to be tested to perform an autofocus shooting when the lens of the camera to be tested directly faces one of the two focusing plates.

In the present disclosure, the camera to be tested and the two focusing plates are driven to rotate by the drive unit, such that the camera to be tested can aim at the two focusing plates in turn. Therefore, the camera to be tested can aim at the two focusing plates respectively under different circumstances. Then, the control unit determines whether the lens of the camera to be tested directly faces one of the two focusing plates according to the status information of the drive unit, and controls the camera to be tested to perform the autofocus shooting when the lens of the camera to be tested directly faces one of the two focusing plates. Since the distance between one of the two focusing plates and the camera to be tested is different from the distance between the other one of the two focusing plates and the camera to be tested, an autofocus test of the camera to be tested at different distances (the distances between the focusing plates and the lens) can be achieved, and the testing process is performed automatically without adjusting the distance manually, thereby reducing cost and improving testing efficiency.

The status information of the drive unit includes positions of components inside the drive unit that drive the camera to be tested or the focusing plate to rotate, such as a rotation angle of an output axis inside the drive unit.

In the present disclosure, the camera may be a camera product such as a digital camera, a single lens reflex camera, or may be a camera component in a mobile terminal (such as a mobile phone and a tablet computer). When the camera is the digital camera or the single lens reflex camera, the control unit can be a separate device, such as a computer and a mobile terminal, and the control unit is connected with the digital camera or the single lens reflex camera via an interface of the digital camera or the single lens reflex camera, so as to control the digital camera or the single lens reflex camera. When the camera is the camera component in the mobile terminal, the control unit may be a processing chip in the mobile terminal, and the processing chip can control the camera component directly.

Figure 2:
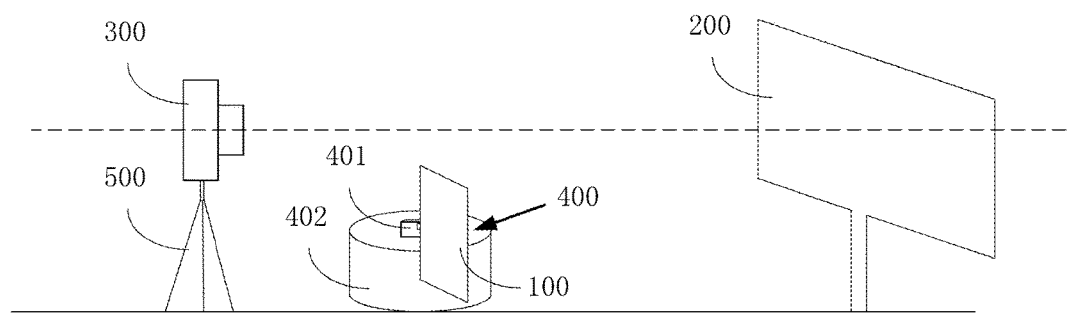
FIG. 2 is a schematic diagram of an autofocus testing device according to an exemplary aspect of the present disclosure.
Figure 3:
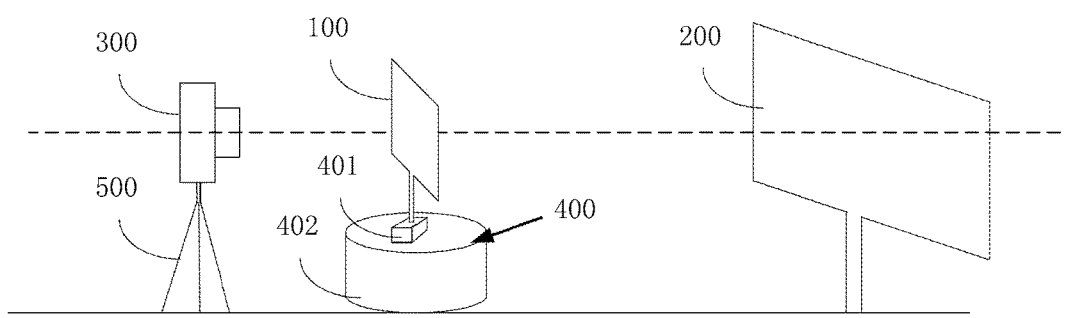
FIG. 3 is a schematic diagram of an autofocus testing device according to an exemplary aspect of the present disclosure.

FIGS. 1-3 are schematic diagrams of an autofocus testing device according to an exemplary aspect. The two focusing plates include a first focusing plate 100 and a second focusing plate 200. The first focusing plate 100 and the second focusing plate 200 are located right in front of a lens of a camera to be tested 300 in sequence and with a space between each other. When the first focusing plate 100 is in an erect state (As illustrated in FIG. 1), the lens of the camera to be tested 300 directly faces the first focusing plate 100. When the first focusing plate 100 is in a fallen state (As illustrated in FIG. 2), the lens of the camera to be tested 300 directly faces the second focusing plate 200. The drive unit 400 includes a first steering engine 401 configured to control the first focusing plate 100 to be in the erect state (As illustrated in FIG. 1) or the fallen state (As illustrated in FIG. 2).

In this aspect, the two focusing plates are located exactly in front of the lens of the camera to be tested 300 in sequence, and then the first focusing plate 100 close to the camera is driven by the drive unit 400 to be in the erect state or the fallen state. In addition, in this aspect, the drive unit 400 includes a first steering engine 401, the first focusing plate 100 is controlled to be in the erect state or the fallen state by the first steering engine 401, which is convenient to control, and is easy to obtain the status information of the drive unit, such that the control unit can control the drive unit conveniently. When the first focusing plate 100 is in the erect state, the lens of the camera to be tested 300 aims at the first focusing plate 100 to perform the autofocus test. When the first focusing plate 100 is in the fallen state, the lens of the camera to be tested 300 aims at the second focusing plate 200 to perform the autofocus test. Specifically, the steering engine mainly includes a shell, a circuit board, a coreless motor, a gear and a position detector. The position detector can detect a rotation of the output axis of the motor to obtain the rotation angle of the output axis and generate the status information.

As illustrated in FIGS. 1-3, each of the first focusing plate 100 and the second focusing plate 200 includes a focusing plate body 10 and a support bar 20, and the focusing plate body 10 is mounted on the support bar 20. When the support bar 20 is in a vertical state, the first focusing plate 100 is in the erect state, and when the support bar 20 is in a horizontal state, the first focusing plate 100 is in the fallen state.

Furthermore, in order to ensure that the lens of the camera to be tested 300 can shoot the second focusing plate 200 when the first focusing plate 100 is in the fallen state, an area of the focusing plate body of the first focusing plate 100 may be less than an area of the focusing plate body of the second focusing plate 200. Alternatively, a length of the support bar 20 is set to exceed a preset value, such that the first focusing plate 100 will not hide the second focusing plate 200 when it is in the fallen state.

As illustrated, in this aspect, the focusing plate body 10 is a rectangular plate, certainly, in other aspects, the focusing plate body 10 may also be a plate of other common shapes, such as a circular plate and a rhombus plate. The first focusing plate 100 and the second focusing plate 200 may be wooden focusing plates, metal focusing plates or plastic focusing plates.

The support bar 20 of the first focusing plate 100 is connected with the output axis of the first steering engine 401, such that when the output axis of the first steering engine 401 rotates, the first focusing plate 100 is driven to rotate in a plane perpendicular to a horizontal plane, and thus the first focusing plate 100 is controlled to be in the erect state or the fallen state. Moreover, the support bar 20 of the first focusing plate 100 is perpendicular to the output axis of the first steering engine 401.

As illustrated in FIGS. 1-3, the drive unit 400 may further include a second steering engine 402 configured to control the first focusing plate 100 to rotate around an axis in a vertical direction, the first focusing plate 100 is arranged on the second steering engine 402. In an aspect, a mounting base may be arranged on the output axis of the second steering engine 402, and the first steering engine 401 is mounted on the mounting base, such that when the output axis of the second steering engine 402 rotates, the first steering engine 401 and the first focusing plate 100 mounted thereon are driven to rotate.

In the aspect, the drive unit 400 further includes a second steering engine 402. The second steering engine 402 is configured to control the first focusing plate 100 to rotate around the axis in the vertical direction, such that the first focusing plate 100 can face the lens of the camera to be tested 300 in different angles, thus completing the autofocus test of different angles (the angle between the focusing plate and a direction of incident light of the lens).

In another aspect, the drive unit 400 may further include a second steering engine 402 configured to control the second focusing plate 200 to rotate around the axis in the vertical direction, and the second focusing plate 200 is arranged on the second steering engine 402.

In yet another aspect, the drive unit 400 may further include two second steering engines 402 configured to control the first focusing plate 100 and the second focusing plate 200 to rotate around the axis in the vertical direction respectively. The first focusing plate 100 and the second focusing plate 200 are arranged on the second steering engine 402 respectively.

For the autofocus testing device provided in FIGS. 1-3, the autofocus testing device may not be provided with the second steering engine. In this case, orientations of plate surfaces (focusing bodies) of the first focusing plate 100 and the second focusing plate 200 are fixed, that is, the plate surface of the first focusing plate 100 faces towards the camera to be tested 300 (that is, the plate surface of the first focusing plate 100 directly faces the camera to be tested 300, and the camera to be tested 300 is in a straight line perpendicular to the plate surface of the first focusing plate 100), and the plate surface of the second focusing plate 200 faces towards the camera to be tested 300.

Figure 4:
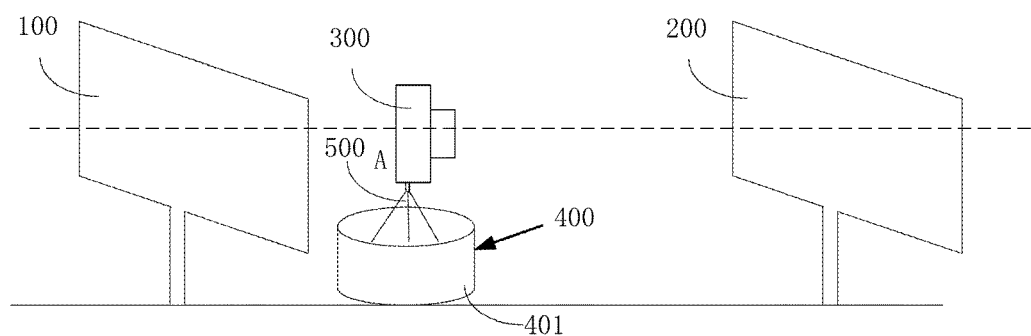
FIG. 4 is a schematic diagram of an autofocus testing device according to another exemplary aspect of the present disclosure.
Figure 5:
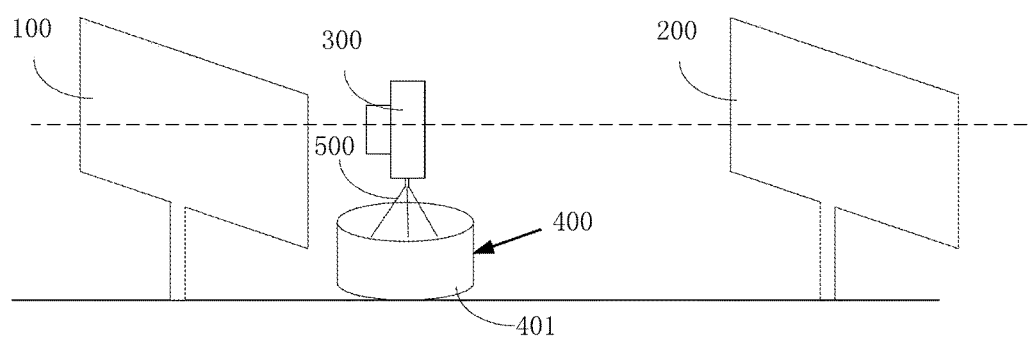
FIG. 5 is a schematic diagram of an autofocus testing device according to another exemplary aspect of the present disclosure.

FIGS. 4-5 are schematic diagrams of an autofocus testing device according to another exemplary aspect. The two focusing plates include the first focusing plate 100 and the second focusing plate 200, and the camera to be tested 300 is located between the first focusing plate 100 and the second focusing plate 200. The drive unit 400 includes the first steering engine 401, and the first steering engine 401 is configured to drive the camera to be tested 300 to rotate to enable the lens of the camera to be tested 300 to directly face the first focusing plate 100 (As illustrated in FIG. 5) or the second focusing plate 200 (As illustrated in FIG. 4).

In this aspect, the two focusing plates are arranged on two sides of the camera to be tested 300 respectively, and then the camera to be tested 300 is driven to rotate by the drive unit 400, such that the lens of the camera to be tested 300 can aim at the first focusing plate 100 and the second focusing plate 200 respectively, thus achieving the autofocus shooting under different distances.

In this aspect, the camera to be tested 300 is arranged on the output axis of the first steering engine 401, and the lens of the camera to be tested 300 is driven to face toward different directions by the rotation of the output axis of the first steering engine 401.

In the autofocus testing device provided in FIGS. 4-5, the drive unit 400 may also include at least one second steering engine 402, the at least one second steering engine 402 is configured to control at least one of the first focusing plate 100 and the second focusing plate 200 to rotate around the axis in the vertical direction.

For the autofocus testing device provided in FIGS. 4-5, the autofocus testing device may not be provided with the second steering engine. In this case, orientations of the plate surfaces (focusing bodies) of the first focusing plate 100 and the second focusing plate 200 are fixed, that is, the plate surface of the first focusing plate 100 faces towards the camera to be tested 300, and the plate surface of the second focusing plate 200 faces towards the camera to be tested 300.

In an aspect of the present disclosure, the distance between the camera to be tested 300 and the first focusing plate 100 is from 10 cm to 30 cm, and the distance between the camera to be tested 300 and the second focusing plate 200 is from 100 cm to 300 cm. Preferably, the distance between the camera to be tested 300 and the first focusing plate 100 is 20 cm, and the distance between the camera to be tested 300 and the second focusing plate 200 is 100 cm or 300 cm. The distance between the camera to be tested 300 and the first focusing plate 100 and the distance between the camera to be tested 300 and the second focusing plate 200 may be set according to a focal length. For example, the distance between the camera to be tested 300 and the first focusing plate 100 is set to a short focal length (such as 20 cm), and the distance between the camera to be tested 300 and the second focusing plate 200 may be set to a middle focal length (such as 100 cm) or a long focal length (such as 300 cm).

In the aspect, the distance between the first focusing plate 100 and the camera to be tested 300 and the distance between the second focusing plate 200 and the camera to be tested 300 are set to be different, thus achieving the autofocus test of different distances.

In an aspect of the present disclosure, each of the first focusing plate 100 and the second focusing plate 200 is provided with a figure for focusing. The figure for focusing may consist of multiple concentric circulars or may be an irregular figure. In another aspect of the present disclosure, each of the first focusing plate 100 and the second focusing plate 200 may not be provided with any figure.

In the aspect, by setting focusing plates provided with focusing figures, it is convenient to perform the autofocus and subsequent testing work.

As illustrated in FIGS. 1-5, in an aspect of the present disclosure, the device further includes a camera base 500, the camera to be tested 300 is arranged on the camera base 500.

In FIG. 4 and FIG. 5, the camera base 500 is arranged on the first steering engine 401. Specifically, the output axis of the first steering engine 401 is connected with a rotatable platform and drives the platform to rotate, and the camera base 500 is arranged on the rotatable platform.

In the aspect, by setting the camera base 500, it is convenient to arrange and fix the camera to be tested 300, and it is convenient for test.

The camera base 500 may be a tripod, which is, on one hand, convenient to fix the camera, and on the other hand, convenient to adjust a height of the camera to be tested 300.

Furthermore, the device may further include a slide rail arranged on the straight line where the first focusing plate 100 and the second focusing plate 200 are. The first focusing plate 100, the second focusing plate 200 and the camera to be tested 300 are arranged on the slide rail. The distances between the camera to be tested 300 and the two focusing plates can be adjusted by controlling positions of the first focusing plate 100, the second focusing plate 200 and the camera to be tested 300.

Figure 6:
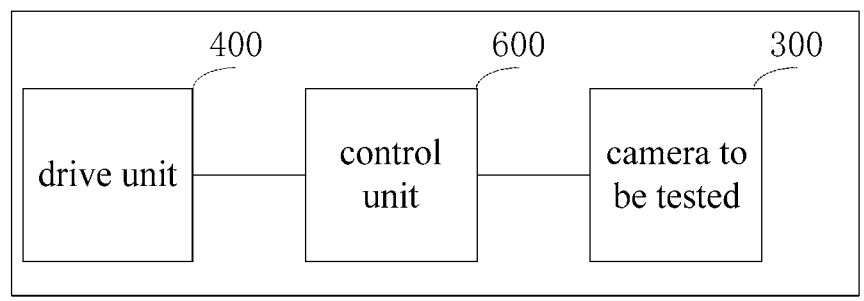
FIG. 6 is a block diagram of an autofocus testing device according to an exemplary aspect of the present disclosure.

FIG. 6 is a block diagram of an autofocus testing device according to an exemplary aspect. As illustrated in FIG. 6, the device includes a control unit 600, and the control unit 600 is configured to control a drive unit 400.

As illustrated in FIG. 6, the control unit 600 is connected with the drive unit 400. When the control unit 600 is started or receives work instructions, the control unit 600 controls the drive unit 400 to work by sending different control instructions to the drive unit 400. In the aspect of FIGS. 1-3, the control unit 600 controls the first steering engine 401 to rotate to a first position (for example, the position corresponding to zero degree of the output axis of the first steering engine 401) by sending a first control instruction, and the control unit 600 controls the first steering engine 401 to rotate to a second position (for example, the position corresponding to 90 degree of the output axis of the first steering engine 401) by sending a second control instruction. When the first steering engine 401 rotates to the first position, the first focusing plate 100 is in the erect state, and when the first steering engine 401 rotates to the second position, the first focusing plate 100 is in the fallen state. In the aspect of FIGS. 4-5, the control unit 600 controls the first steering engine 401 to rotate to a third position (for example, the position corresponding to zero degree of the output axis of the first steering engine 401) by sending a third control instruction, and the control unit 600 controls the first steering engine 401 to rotate to a fourth position (for example, the position corresponding to 180 degree of the output axis of the first steering engine 401) by sending a fourth control instruction. When the first steering engine 401 rotates to the third position, the lens of the camera to be tested 300 aims at the first focusing plate 100, and when the first steering engine 401 rotates to the fourth position, the lens of the camera to be tested 300 aims at the second focusing plate 200.

Furthermore, in the aspect of FIGS. 1-3, the control unit 600 is further configured to send control instructions to the second steering engine 402 to control the second steering engine 402 to rotate in a certain range, such as 0-180 degrees. The focusing surface (provided with the focusing figure) of the first focusing plate 100 directly faces the lens of the camera to be tested 300 when the second steering engine 402 rotates to zero degree, and a side of the first focusing plate 100 directly faces the lens of the camera to be tested 300 when the second steering engine 402 rotates to 180 degree.

Furthermore, the control unit 600 is further configured to obtain the status information of the first steering engine 401, to determine whether the lens of the camera to be tested 300 directly faces the first focusing plate 100 or the second focusing plate 200 according to the status information, and to control the camera to be tested to 300 to perform the autofocus shooting when the lens of the camera to be tested 300 directly faces the first focusing plate 100 and the second focusing plate 200 respectively.

The control unit 600 is connected with the camera to be tested 300, and the control unit 600 receives the status information returned by the steering engine. When determining that the steering engine rotates to a designated position, the control unit 600 controls the camera to be tested 300 to perform the autofocus shooting.

In aspects of the present disclosure, the control unit 600 is further configured to analyze a picture taken by the autofocus shooting of the camera to be tested 300, and to determine whether the autofocus of the camera to be tested 300 is successful.

Furthermore, the control unit 600 is further configured to, when the lens of the camera to be tested 300 directly faces the first focusing plate 100, control the second steering engine to drive the first focusing plate 100 to rotate to enable the first focusing plate 100 to face the lens of the camera to be tested 300 in a preset angle; or the control unit 600 is further configured to, when the lens of the camera to be tested 300 directly faces the second focusing plate 200, control the second steering engine to drive the second focusing plate 200 to rotate to enable the second focusing plate 200 to face the lens of the camera to be tested 300 in a preset angle.

When the camera to be tested 300 completes the autofocus shooting, the control unit 600 obtains and analyzes the picture taken by the camera to be tested 300, and determines whether the autofocus of the camera to be tested 300 is successful.

In practice, the control unit 600 may input the picture taken by the camera to be tested 300 into a picture analysis tool (such as image test, slanted edge) to analyze a modulation transfer function (MTF for short) value of the picture, and to further determine whether the autofocus of the camera to be tested 300 is successful. Specifically, different standard MTF values can be set for focusing plates of different distances, different shapes and different figures. When the MTF value obtained by analysis reaches the standard MTF value, it is determined that the autofocus of the camera to be tested 300 is successful, and when the MTF value obtained by analysis does not reach the standard MTF value, it is determined that the autofocus of the camera 300 to be tested is not successful.

In the aspect, the control unit 600 determines whether the autofocus of the camera to be tested 300 is successful according to the taken picture, thus completing the autofocus shooting test.

The technical solutions provided in aspects of the present disclosure may have following advantageous effects.

In the present disclosure, the camera to be tested and the two focusing plates are driven to rotate by the drive unit, such that the camera to be tested can aim at the two focusing plates in turn. Therefore, the camera to be tested can aim at the two focusing plates under different circumstances. Since the distance between one of the two focusing plates and the camera to be tested is different from the distance between the other one of the two focusing plates and the camera to be tested, the autofocus test of the camera to be tested at different distances (the distance between the focusing plate and the lens) can be achieved, and the testing process is performed automatically without adjusting the distance manually, thereby reducing cost and improving testing efficiency.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An autofocus testing device, comprising:
a first focusing plate;
a second focusing plate;
a driver configured to drive at least one of a camera and the first and second focusing plates to aim a lens of the camera at the first and second focusing plates in turn, wherein a first distance between the first focusing plate and the camera is different from a second distance between the second focusing plate and the camera; and
a controller configured to:
obtain status information of the driver,
determine whether the lens is aimed at one of the first and second focusing plates based on the status information, and
control the camera to perform an autofocus image capture operation when the lens is aimed at one of the first and second focusing plates,
wherein the first focusing plate and the second focusing plate are disposed on an optical axis of the lens in front of the lens of the camera,
wherein the driver includes a first steering engine configured to control the first focusing plate to be in an erect state or a fallen state,
wherein, when the first focusing plate is in the erect state, the first focusing plate intersects the optical axis and directly faces the lens of the camera, and
wherein, when the first focusing plate is in the fallen state, the first focusing plate does not intersect the optical axis, and the second focusing plate intersects the optical axis and directly faces the lens of the camera.

2. An autofocus testing device, comprising:
a first focusing plate;
a second focusing plate;
a driver configured to drive at least one of a camera and the first and second focusing plates to aim a lens of the camera at the first and second focusing plates in turn, wherein a first distance between the first focusing plate and the camera is different from a second distance between the second focusing plate and the camera; and
a controller configured to:
obtain status information of the driver,
determine whether the lens is aimed at one of the first and second focusing plates based on the status information, and
control the camera to perform an autofocus image capture operation when the lens is aimed at one of the first and second focusing plates,
wherein the camera is disposed between the first focusing plate and the second focusing plate, and
the driver includes a first steering engine that is configured to rotate the camera such that the lens of the camera is directed towards the first focusing plate or the second focusing plate.

3. The device according to claim 1, wherein a surface of the first focusing plate faces towards the camera, and a surface of the second focusing plate faces towards the camera.

4. The device according to claim 2, wherein a surface of the first focusing plate faces towards the camera, and a surface of the second focusing plate does not face towards the camera.

5. The device according to claim 1, wherein the driver further includes at least one second steering engine configured to control at least one of the first focusing plate and the second focusing plate to rotate around an axis in a vertical direction.

6. The device according to claim 2, wherein the driver further includes at least one second steering engine configured to control at least one of the first focusing plate and the second focusing plate to rotate around an axis in a vertical direction.

7. The device according to claim 5, wherein the controller is further configured to:
when the lens of the camera directly faces the first focusing plate, control the second steering engine to drive the first focusing plate to rotate the first focusing plate to face the lens of the camera in a preset angle; and
when the lens of the camera to be tested directly faces the second focusing plate, control the second steering engine to drive the second focusing plate to rotate the second focusing plate to face the lens of the camera in a preset angle.

8. The device according to claim 1, wherein the distance between the camera and the first focusing plate is from 10 cm to 30 cm, and the distance between the camera and the second focusing plate is from 100 cm to 300 cm.

9. The device according to claim 2, wherein the distance between the camera and the first focusing plate is from 10 cm to 30 cm, and the distance between the camera and the second focusing plate is from 100 cm to 300 cm.

10. The device according to claim 1, wherein the controller is further configured to:
analyze an image taken by the autofocus image capture operation; and
determine whether an autofocus function of the autofocus image capture operation is operating successfully.

11. The device according to claim 1, further comprising a camera base, wherein the camera is arranged on the camera base.

12. The device according to claim 1, wherein each of the first focusing plate and the second focusing plate is provided with a figure for focusing.

13. The device according to claim 2, wherein each of the first focusing plate and the second focusing plate is provided with a figure for focusing.

14. The device according to claim 2, wherein the controller is further configured to:
analyze an image taken by the autofocus image capture operation; and determine whether an autofocus function of the autofocus image capture operation is operating successfully.

15. The device according to claim 2, further comprising a camera base, wherein the camera is arranged on the camera base.

* * * * *